US012126972B2

(12) United States Patent
Boldt et al.

(10) Patent No.: US 12,126,972 B2
(45) **Date of Patent: *Oct. 22, 2024**

(54) HEARING DEVICE WITH IN-EAR MICROPHONE AND RELATED METHOD

(71) Applicant: GN Hearing A/S, Ballerup (DK)

(72) Inventors: Jesper B. Boldt, Ballerup (DK); Erik Cornelis Diederik Van Der Werf, Eindhoven (NL); Rob De Vries, Tilburg (NL)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,744

(22) Filed: Jun. 29, 2023

(65) Prior Publication Data

US 2023/0345174 A1 Oct. 26, 2023

Related U.S. Application Data

(63) Continuation of application No. 17/377,326, filed on Jul. 15, 2021, now Pat. No. 11,743,641.

(30) Foreign Application Priority Data

Aug. 14, 2020 (DK) .......................... PA 2020 70530

(51) Int. Cl.
*H04R 3/00* (2006.01)

(52) U.S. Cl.
CPC .................................... *H04R 3/005* (2013.01)

(58) Field of Classification Search
CPC ................................ H04R 3/005; H04R 25/00
(Continued)

(56) References Cited

U.S. PATENT DOCUMENTS

| | | | | |
|---|---|---|---|---|
| 2004/0136541 A1* | 7/2004 | Hamacher | .............. | H04R 25/70 381/60 |
| 2010/0046775 A1* | 2/2010 | Tiefenau | .............. | H04R 25/407 381/313 |
| 2011/0033063 A1* | 2/2011 | McGrath | ................ | H04R 3/005 381/92 |

FOREIGN PATENT DOCUMENTS

| | | |
|---|---|---|
| CN | 103916806 A | 7/2014 |
| CN | 103916807 A | 7/2014 |

(Continued)

OTHER PUBLICATIONS

Final Office Action for U.S. Appl. No. 17/377,326 dated Jan. 13, 2023.

(Continued)

*Primary Examiner* — William A Jerez Lora
(74) *Attorney, Agent, or Firm* — Vista IP Law Group, LLP

(57) ABSTRACT

A hearing device includes: a first housing; a second housing; first and second primary microphones for provision of first and second primary microphone input signals; a secondary microphone in the second housing for provision of a secondary microphone input signal; a mixing module for provision of a mixer output based on a primary mixer input and a secondary mixer input, wherein the primary mixer input is based on the first primary microphone input signal and the second primary microphone input signal, and the secondary mixer input is based on the secondary microphone input signal; a processing unit configured to process the mixer output and to provide an electrical output signal; and a receiver for converting the electrical output signal to an audio output signal; wherein the mixing module is configured to mix a first component of the primary mixer input and a first component of the secondary mixer input.

36 Claims, 4 Drawing Sheets

(58) Field of Classification Search
USPC .......................................... 381/23.1, 119, 312
See application file for complete search history.

(56) References Cited

FOREIGN PATENT DOCUMENTS

| | | | | | |
|---|---|---|---|---|---|
| CN | 108989929 | A | | 12/2018 | |
| CN | 110662152 | A | | 1/2020 | |
| EP | 2088802 | | | 8/2009 | |
| EP | 2806660 | | | 11/2014 | |
| EP | 2806660 | A1 | * | 11/2014 | ........... H04R 25/407 |
| EP | 3506658 | | | 3/2019 | |
| WO | WO 2004/077090 | | | 9/2004 | |
| WO | WO 2016/089745 | | | 6/2016 | |

OTHER PUBLICATIONS

Non-Final Office Action for U.S. Appl. No. 17/377,326 dated Aug. 23, 2022.
Amendment Response to NFOA for U.S. Appl. No. 17/377,326 dated Oct. 26, 2022.
Amendment Response to FOA for U.S. Appl. No. 17/377,326 dated Apr. 12, 2023.
Notice of Allowance for U.S. Appl. No. 17/377,326 dated Apr. 12, 2023.
Foreign Office Action dated Feb. 2, 2021 for Danish Patent Application No. 2020 70530.
Foreign OA for CN Patent Appln. No. 202110928574.5 dated Jan. 17, 2024.
English Translation for Foreign OA for CN Patent Appln. No. 202110928574.5 dated Jan. 17, 2024.

* cited by examiner

HEARING DEVICE WITH IN-EAR MICROPHONE AND RELATED METHOD

RELATED APPLICATION DATA

This application is a continuation of U.S. patent application Ser. No. 17/377,326 filed on Jul. 15, 2021, pending, which claims priority to, and the benefit of, Danish Patent Application No. PA 2020 70530 filed on Aug. 14, 2020. The entire disclosures of the above applications are expressly incorporated by reference.

FIELD

The present disclosure relates to a hearing device and related methods including a method of operating a hearing device. In particular, a hearing device with both an in-ear microphone and one or more behind-the-ear microphones and related method are disclosed.

BACKGROUND

For hearing device designers, spatial perception and the ability to perceive spatial cues play an important role in a hearing device user's ability to understand speech and crucial for complex listening environments. On the other hand, feedback and instabilities in hearing aids continue to represent challenges to hearing device designers and engineers in particular when microphones and receiver are placed near each other, for example in a MaRie (Microphone and Receiver in ear) hearing device.

SUMMARY

Accordingly, there is a need for hearing devices and methods with improved spatial perception and stability of the hearing device.

A hearing device is disclosed, the hearing device comprising a first housing optionally configured as a behind-the-ear housing to be worn behind the pinna of a user; a second housing optionally configured as an earpiece housing to be worn in or at the ear canal of a user; and a wire connecting the first housing and the second housing. The hearing device comprises a primary set of microphones arranged in the first housing, the primary set of microphones including a primary first microphone for provision of a primary first microphone input signal, and optionally a primary second microphone for provision of a primary second microphone input signal. The hearing device comprises a secondary microphone arranged in the second housing for provision of a secondary microphone input signal; a mixing module for provision of a mixer output based on a primary mixer input and a secondary mixer input, wherein the primary mixer input is based on the primary first microphone input signal and/or the primary second microphone input signal, and the secondary mixer input is based on the secondary microphone input signal; a processor for processing the mixer output and providing an electrical output signal based on mixer output; and a receiver for converting the electrical output signal to an audio output signal. The mixing module is optionally configured to mix a primary first component of the primary mixer input and a secondary first component of the secondary mixer input for provision of a first component of the mixer output.

Further, a method of operating a hearing device comprising a first housing configured as a behind-the-ear housing to be worn behind the pinna of a user; a second housing configured as an earpiece housing to be worn in or at the ear canal of a user; a wire connecting the first housing and the second housing; a primary set of microphones arranged in the first housing, the primary set of microphones including a primary first microphone and a primary second microphone; a secondary microphone arranged in the second housing; a mixing module; a processor; and a receiver is provided, the method comprising: obtaining a primary first microphone input signal with the primary first microphone; obtaining a primary second microphone input signal with the primary second microphone; obtaining a secondary microphone input signal with the secondary microphone; providing a primary mixer input based on the primary first microphone input signal and/or the primary second microphone input signal; providing a secondary mixer input based on the secondary microphone input signal; mixing a primary first component of the primary mixer input and a secondary first component of the secondary mixer input for provision of a first component of a mixer output; processing the mixer output for provision of an electrical output signal; and converting the electrical output signal to an audio output signal.

It is an important advantage of the hearing device that improved spatial perception in a hearing device with increased stability is provided. Accordingly, the risk of feedback in the hearing device is reduced while spatial cues are preserved to a higher degree, which in turn provides an improved hearing device.

Further, the present disclosure provides improved user experience by improving speech intelligibility and reducing feedback.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
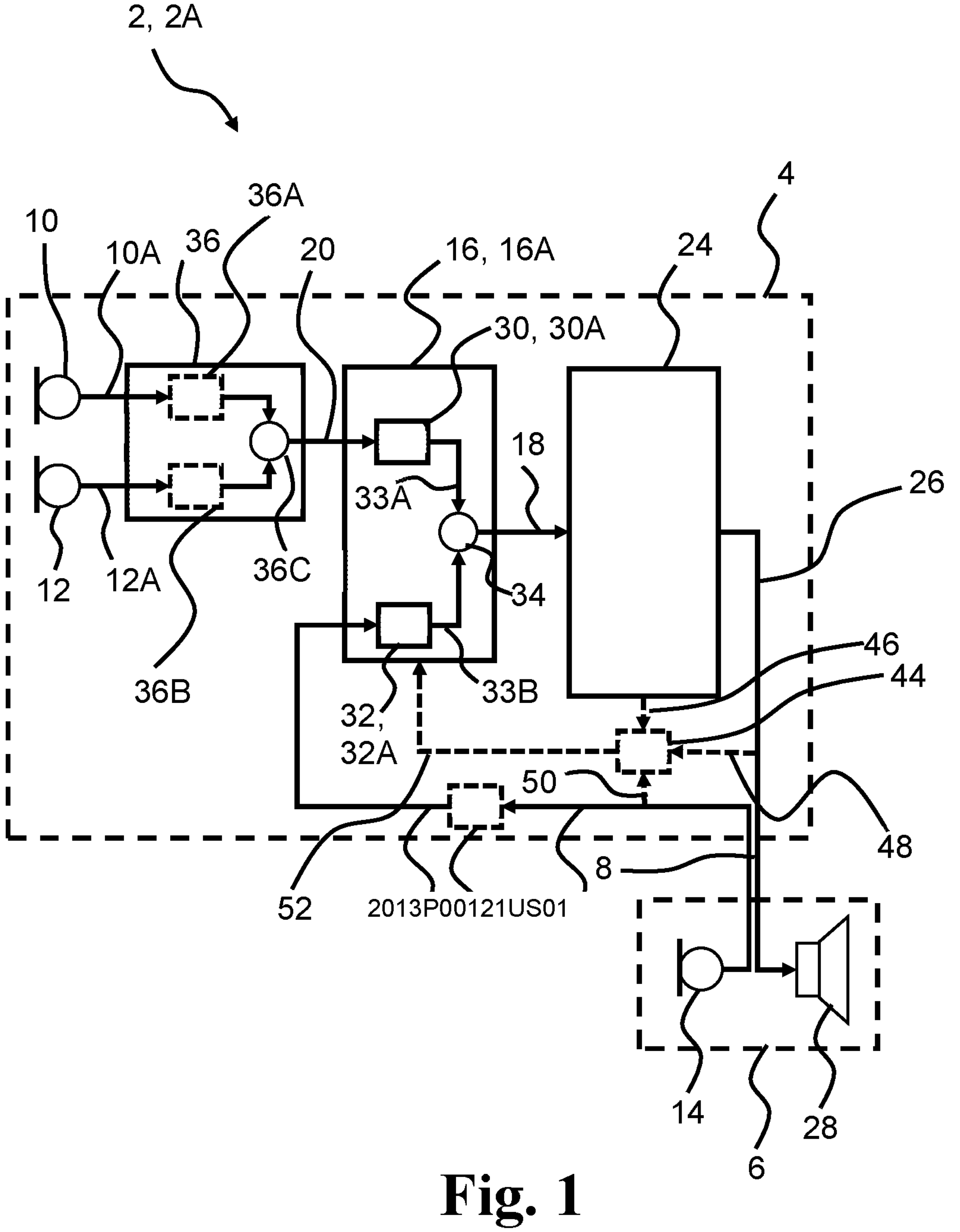
FIG. 1 schematically illustrates exemplary hearing devices.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processor is configured to compensate for a hearing loss of a user.

The hearing device may be of the Microphone-and-Receiver-in ear (MaRIE) type. The hearing device may be a combined BTE and MaRIE type hearing device. The hearing device may be part of a binaural hearing system. Thus, the hearing device may be a binaural hearing device.

The hearing device comprises a first housing configured as a behind-the-ear housing to be worn behind the pinna of a user and a second housing configured as an earpiece housing to be worn in and/or at the ear canal of a user.

The hearing device comprises a wire connecting the first housing and the second housing. The wire comprises a plurality of conductors, e.g. three, four, five, six, or even eight or more conductors for electrically connecting electrical components of the first housing to electrical components of the second housing.

The hearing device comprises a primary set of microphones arranged in the first housing, the primary set of microphones including a primary first microphone for provision of a primary first microphone input signal also denoted x_1_1, and optionally a primary second microphone for provision of a primary second microphone input signal also denoted x_1_2. The primary first microphone may be denoted a front BTE (behind-the-ear) microphone and the primary second microphone may be denoted a rear BTE (behind-the-ear) microphone. The primary set of microphones may comprise a primary third microphone for provision of a primary third microphone input signal also denoted x_1_3.

The hearing device comprises a secondary microphone, also denoted secondary first microphone, arranged in the second housing for provision of a secondary microphone input signal also denoted x_2 or x_2_1. The secondary microphone may be denoted an in-ear microphone. The hearing device may comprise a plurality of secondary microphones arranged in the second housing. For example, a secondary second microphone, also denoted a canal microphone, may be arranged in the second housing for receiving intra-canal sounds in order to reduce occlusion effects.

The hearing device comprises a mixing module for provision of a mixer output based on a primary mixer input and a secondary mixer input. The primary mixer input is optionally based on the primary first microphone input signal and/or the primary second microphone input signal, and the secondary mixer input is based on the secondary microphone input signal or a plurality of secondary microphone input signals.

In one or more exemplary hearing devices, the hearing device comprises a primary pre-processor connected to respective primary first microphone and primary second microphone for pre-processing the primary first microphone input signal and the primary second microphone input signal for provision of the primary mixer input. The primary pre-processor may comprise a first filter and/or a second filter for filtering the primary first microphone input signal and/or the primary second microphone input signal before adding the (optionally filtered) primary first microphone input signal and the (optionally filtered) primary second microphone input signal in adder of the first pre-processor. The first filter of the primary pre-processor may be a pinna-restoration filter, i.e. a filter configured to perform pinna-restoration of the primary first microphone input signal. The second filter of the primary pre-processor may be a pinna-restoration filter, i.e. a filter configured to perform pinna-restoration of the primary second microphone input signal.

In one or more exemplary hearing devices, the hearing device comprises a secondary pre-processor connected to the secondary microphone for pre-processing the secondary microphone input signal for provision of the secondary mixer input.

The hearing device comprises a processor for processing the mixer output. The processor provides an electrical output signal based on the mixer output (fed as processor input) to the processor. The processor may be configured for hearing compensation of a user's hearing loss. The processor may be a multi-channel processor. In other words, the processor input may be a multi-channel input, where each channel or (frequency) component is processed in parallel.

The hearing device comprises a receiver for converting the electrical output signal to an audio output signal.

The mixing module is configured to mix the primary mixer input and the secondary mixer input for provision of the mixer output. In one or more exemplary hearing devices, the mixing module is configured to mix a primary first component of the primary mixer input and a secondary first component of the secondary mixer input for provision of a first component of the mixer output. The mixing module is configured to mix a primary first component of the primary mixer input and a secondary first component of the secondary mixer input for provision of a first component of the mixer output.

The primary first component of the primary mixer input and the secondary first component of the secondary mixer input may be broadband components.

The primary first component of the primary mixer input and the secondary first component of the secondary mixer input may be components of a first frequency band or first frequency bin. In one or more exemplary hearing devices/methods, a center frequency of the first frequency band/frequency bin is less than 1 kHz or even less than 400 Hz. A center frequency of the first frequency band/frequency bin may be in a range from 400 Hz to 2 kHz or larger than 2 kHz, such as larger than 3 kHz.

In the hearing device, to mix the primary mixer input and the secondary mixer input for provision of the mixer output may comprise applying primary mixing filter(s) or primary gain(s)/coefficient(s) to the primary mixer input. The primary mixing filter(s) may be a time-domain filter or a frequency-domain filter. In other words, the mixing module may comprise primary filter(s) and/or primary gain unit(s) for receiving and processing the primary mixer input.

In the hearing device, to mix the primary mixer input and the secondary mixer input for provision of the mixer output may comprise applying secondary mixing filter(s) or secondary gain(s)/coefficient(s) to the secondary mixer input. The secondary mixing filter(s) may be a time-domain filter or a frequency-domain filter. In other words, the mixing module may comprise secondary filter(s) and/or secondary gain unit(s) for receiving and processing the secondary mixer input.

In the hearing device, to mix the primary mixer input and the secondary mixer input may comprise adding the output from the primary mixing filter(s)/primary gain unit(s) and the output from the secondary mixing filter(s)/secondary gain unit(s). In other words, the mixing module may comprise an adder (single-channel or multi-channel) connected to primary mixing filter(s)/primary gain unit(s) and secondary mixing filter(s)/secondary gain unit(s) for provision of an adder output as the mixer output.

The mixing module may be a multi-channel mixing module configured to perform mixing of a plurality of components/channels. In one or more exemplary hearing devices, the mixing module is optionally configured to mix a primary second component of the primary mixer input and a secondary second component of the secondary mixer input for provision of a second component of the mixer output. The mixing module is optionally configured to mix a primary second component of the primary mixer input and a secondary second component of the secondary mixer input for provision of a second component of the mixer output. The primary second component of the primary mixer input and the secondary second component of the secondary mixer input may be components of a second frequency band or second frequency bin, e.g. different from the first frequency band/frequency bin.

In one or more exemplary hearing devices and/or methods, to mix the primary first component, also denoted x_p_1, of the primary mixer input and the secondary first component x_s_1 of the secondary mixer input comprises to apply a first linear combination to the primary first component and the secondary first component for provision of the first component of the mixer output. In other words, the first component y_1 of the mixer output may be given as:

$$y\_1=a\_1*x\_p\_1+b\_1*x\_s\_1,$$

where a_1 is a primary coefficient and b_1 is a secondary coefficient. The first linear combination, also denoted LC_1, may be defined by primary coefficient a_1 and secondary coefficient b_1.

The primary coefficient a_1 of the first linear combination may be larger than 0. The secondary coefficient b_1 of the first linear combination may be larger than 0. In one or more exemplary hearing devices and/or methods, the primary coefficient a_1 may be in the range between 0 and 1. In one or more exemplary hearing devices and/or methods, the secondary coefficient b_1 may be in the range between 0 and 1.

In one or more exemplary hearing devices, the primary coefficient a_1 may be in the range between 0.1 and 0.9. and/or the secondary coefficient b_1 may be in the range between 0.1 and 0.9. The secondary coefficient b_1 may be larger than 0.5 or less than 0.5.

In one or more exemplary hearing devices, the mixing module is configured to mix a primary second component, also denoted x_p_2, of the primary mixer input and a secondary second component, also denoted x_s_2, of the secondary mixer input for provision of a second component, also denoted y_2, of the mixer output.

The primary second component of the primary mixer input and the secondary second component of the secondary mixer input may be components of a second frequency band or second frequency bin. In one or more exemplary hearing devices/methods, a center frequency of the second frequency band/frequency bin is less than 1 kHz or even less than 400 Hz. A center frequency of the second frequency band/frequency bin may be in a range from 400 Hz to 2 kHz or larger than 2 kHz, such as larger than 3 kHz. The second frequency band/frequency bin may be different from the first frequency band/frequency bin.

In one or more exemplary hearing devices, to mix the primary second component of the primary mixer input and the secondary second component of the secondary mixer input comprises to apply a second linear combination to the primary second component and the secondary second component for provision of the second component of the mixer output. In other words, the second component y_2 of the mixer output may be given as:

$$y\_2=a\_2*x\_p\_2+b\_2*x\_s\_2,$$

where a_2 is a primary coefficient and b_2 is a secondary coefficient. The second linear combination, also denoted LC_2, may be defined by primary coefficient a_2 and secondary coefficient b_2. The second linear combination may be different from the first linear combination. Different linear combinations or different mixing of primary mixer input and secondary mixer for different components, e.g. in different frequency bands, may further optimize the spatial perception for the hearing device user, since feedback and instability in general depends on frequency. Thus, the present disclosure allows for increased use of the secondary microphone (high coefficient) in frequency bands where the feedback is low which may lead to improved spatial perception. Further, a low secondary coefficient may be used in frequency bands with severe feedback challenges.

In one or more exemplary hearing devices, the primary coefficient a_2 may be in the range between 0.1 and 0.9. and/or the secondary coefficient b_2 may be in the range between 0.1 and 0.9. The secondary coefficient b_2 may be larger than or less than 0.5. The secondary coefficient b_2 may be different from the secondary coefficient b_1.

In or more exemplary hearing devices, the secondary coefficient b_1 is larger than 0.5, such as in the range from 0.55 to 0.95 and the secondary coefficient b_2 is less than 0.5, such as in the range from 0.05 to 0.45.

In one or more exemplary hearing devices, the mixing module is configured to mix a primary third component, also denoted x_p_3, of the primary mixer input and a secondary third component, also denoted x_s_3, of the secondary mixer input for provision of a third component, also denoted y_3, of the mixer output.

The primary third component of the primary mixer input and the secondary third component of the secondary mixer input may be components of a third frequency band or third frequency bin. In one or more exemplary hearing devices/methods, a center frequency of the third frequency band/frequency bin is less than 1 kHz or even less than 400 Hz. A center frequency of the third frequency band/frequency bin may be in a range from 400 Hz to 2 kHz or larger than 2 kHz, such as larger than 3 kHz. The third frequency band/frequency bin may be different from the first frequency band/frequency bin and/or different from the second frequency band/frequency bin.

In one or more exemplary hearing devices, to mix the primary third component of the primary mixer input and the secondary third component of the secondary mixer input comprises to apply a third linear combination to the primary third component and the secondary third component for provision of the third component of the mixer output. In other words, the third component y_3 of the mixer output may be given as:

$$y\_3=a\_3*x\_p\_3+b\_3*x\_s\_3,$$

where a_3 is a primary coefficient and b_3 is a secondary coefficient. The third linear combination, also denoted LC_3, may be defined by primary coefficient a_3 and secondary coefficient b_3. The third linear combination may be different from the first linear combination.

In one or more exemplary hearing devices, the primary coefficient a_3 may be in the range between 0.1 and 0.9. and/or the secondary coefficient b_3 may be in the range between 0.1 and 0.9. The secondary coefficient b_3 may be larger than 0.5. The secondary coefficient b_3 may be different from the secondary coefficient b_1 and/or different from the secondary coefficient b_2.

In or more exemplary hearing devices, the secondary coefficient b_1 is larger than 0.5, such as in the range from 0.55 to 0.95 and/or the secondary coefficient b_2 is less than 0.5, such as in the range from 0.05 to 0.45.

Exemplary coefficients of exemplary hearing devices A-G are outlined in the following table where LC_1 is linear combination of first component with first center frequency f_1, LC_2 is linear combination of second component with second center frequency f_2, and LC_3 is linear combination of third component with third center frequency f_3.

TABLE 1

| | LC_1 (a_1, b_1) | f_1 | LC_2 (a_2, b_2) | f_2 | LC_3 (a_3, b_3) | f_3 |
|---|---|---|---|---|---|---|
| A | 0.1 < a_1 < 0.9<br>0.1 < b_1 < 0.9 | N/A | N/A | N/A | N/A | N/A |
| B | 0.1 < a_1 < 0.9<br>0.1 < b_1 < 0.9 | f_1 = 1 kHz | a_2 < 0.5<br>b_2 > 0.5 | f_2 < 400 Hz | a_3 < 0.5<br>b_3 > 0.5 | f_3 > 2 kHz |
| C | 0.1 < a_1 < 0.9<br>0.1 < b_1 < 0.9 | f_1 > 1 kHz | a_2 = 0<br>b_2 = 1 | f_2 < 400 Hz | a_3 = 1<br>b_3 = 0 | 400 < f_3 < 1 kHz |
| D | a_1 = 1<br>b_1 = 0 | f_1 < 2 kHz | a_2 = 0<br>b_2 = 1 | f_2 > 2 kHz | | |
| E | 0.1 < a_1 < 0.9<br>0.1 < b_1 < 0.9 | f_1 > 1 kHz | a_2 = 0<br>b_2 = 1 | f_2 < 1 kHz | a_3 = 0<br>b_3 = 1 | f_3 > 3 KHz |
| F | 0.5 >= a_1 >= 0.1<br>0.5 <= b_1 <= 0.9 | N/A | N/A | N/A | N/A | N/A |
| G | 0.5 >= a_1<br>0.5 <= b_1 | f_1 > 3 kHz | 0.25 >= a_1<br>0.75 <= b_1 | | | |

Further, it is an important advantage of the present disclosure that the linear combinations/mixing filters may be individually set during fitting and configured to the specific hearing device user. Thereby, improved hearing device operation/listening experience is provided. In particular, a hearing device with improved directionality is provided.

In one or more exemplary hearing devices, the mixing module is configured to mix primary components x_p_i, of the primary mixer input and secondary components x_s_i of the secondary mixer input for provision of components y_i of the mixer output, e.g. by application of linear combinations LC_i=(a_i, b_i), where i is an index of the i'th component of the respective mixer inputs, mixer output and linear combinations defined by primary and secondary coefficients. In other words, the mixer output components y_i, i=1 to N (N is the number of components/frequency bands) may be given as:

$$y\_i=a\_i*x\_p\_i+b\_i*x\_i$$

In one or more exemplary hearing devices, a_i and b_i are complementary, i.e. a_i+b_i=1 at least for one or a plurality, such as all, of i=1, 2, . . . , N.

In one or more exemplary hearing devices, one or more primary coefficients a_i, e.g. for i=1, 2 or 3, may be 0 and/or one or more secondary coefficients b_i, e.g. for i=1, 2 or 3, may be 1.

In one or more exemplary hearing devices, one or a plurality, such as all, of primary coefficients a_i, e.g. for i=1, 2, and 3, may be in the range from 0.1 to 0.9 and/or less than 0.5. Thus, the primary coefficient a_1 may be in the range from 0.1 to 0.9 and/or less than 0.5. The primary coefficient, a_2 may be in the range from 0.1 to 0.9 and/or less than 0.5. The primary coefficient, a_3 may be in the range from 0.1 to 0.9 and/or less than 0.5.

In one or more exemplary hearing devices, one or a plurality, such as all, of secondary coefficients b_i, e.g. for i=1, 2, and 3, may be in the range from 0.1 to 0.9 and/or larger than 0.5. Thus, the secondary coefficient b_1 may be in the range from 0.1 to 0.9 and/or larger than 0.5. The secondary coefficient, b_2 may be in the range from 0.1 to 0.9 and/or larger than 0.5. The secondary coefficient, b_3 may be in the range from 0.1 to 0.9 and/or larger than 0.5.

The number i of frequency bands/components may be larger than five, such as larger than fifteen.

In one or more exemplary hearing devices, the hearing device comprises a mixing controller configured to apply a mixing scheme in the mixing module based on a control parameter. The control parameter may be indicative of instability in the hearing device. The control parameter may be indicative of feedback and/or howling in the hearing device.

In one or more exemplary hearing devices, the mixing controller is configured to determine the control parameter based on one or more of primary first microphone input signal, primary second microphone input signal, secondary (first) microphone input signal, and electrical output signal. In other words, the control parameter may be fed to the mixing controller, e.g. from the processor, or determined in the mixing controller.

In one or more exemplary hearing devices, the control parameter is based on one or more coefficients, such as primary coefficient(s) and/or secondary coefficient(s). In one or more exemplary hearing devices, the control parameter is based on one or more gains applied in compressor(s) of the processor or a change in one or more gains applied in compressor(s) of the processor.

In one or more exemplary hearing devices, the control parameter is based on one or more operating parameters of the hearing device processing, such as one or more gains, a program identifier, one or more feedback cancellation parameters, or other parameters indicative of instability in the hearing device processing.

In one or more exemplary hearing devices, the control parameter is based on one or more maximum stable gain, e.g. maximum stable gain in each frequency band or frequency bin.

In one or more exemplary hearing devices, to apply a mixing scheme in the mixing module comprises to increase an amount of the primary first component in the mixer output in response to a detection of the control parameter being indicative of increased risk of instability in the hearing device or in response to a detection of control parameter being indicative of large or increasing feedback in the hearing device.

In one or more exemplary hearing devices, to apply a mixing scheme in the mixing module comprises to decrease an amount of the secondary first component in the mixer output in response to a detection of the control parameter being indicative of increased risk of instability in the hearing device or in response to a detection of control parameter being indicative of large or increasing feedback in the hearing device. To decrease an amount of the secondary first component in the mixer output may comprise to reduce a secondary coefficient or gain b_1 applied to the secondary first component of the secondary mixer input.

In one or more exemplary hearing devices, to apply a mixing scheme in the mixing module comprises to apply a first mixing scheme in the mixing module in accordance with a determination that a first mixing criterion is satisfied. Accordingly, the mixing controller may be configured to determine if the first mixing criterion is satisfied. The first mixing criterion may be based on one or more control parameters. For example, a first mixing scheme may be applied in accordance with a determination that a program identifier being used as control parameter is indicative of a first program being applied in the processor.

In one or more exemplary hearing devices, to apply a mixing scheme in the mixing module comprises to apply a second mixing scheme in the mixing module in accordance with a determination that a second mixing criterion is satisfied. Accordingly, the mixing controller may be configured to determine if the second mixing criterion is satisfied. The second mixing criterion may be based on one or more control parameters. For example, a second mixing scheme may be applied in accordance with a determination that a program identifier being used as control parameter is indicative of a second program being applied in the processor. The first mixing scheme may be different from the second mixing scheme.

The mixing controller may be configured to determine the control parameter, e.g. based on the electrical output signal and/or the secondary microphone input signal, and determine the mixing scheme based on the control parameter.

In one or more exemplary hearing devices, to mix the primary first component of the primary mixer input and the secondary first component of the secondary mixer input comprises to apply a primary first filter, e.g. in the time-domain, to the primary first component and/or apply a secondary first filter, e.g. in the time-domain, to the secondary first component. In one or more exemplary hearing devices, to mix the primary first component of the primary mixer input and the secondary first component of the secondary mixer input comprises to add the filtered primary first component and the filtered secondary first component for provision of the mixer output.

In one or more exemplary hearing devices, to mix the primary first component of the primary mixer input and the secondary first component of the secondary mixer input comprises to apply a primary first filter, e.g. in the time-domain, to the primary first component and add the filtered primary first component and the secondary first component for provision of the mixer output.

In one or more exemplary hearing devices, to mix the primary first component of the primary mixer input and the secondary first component of the secondary mixer input comprises to apply a secondary first filter, e.g. in the time-domain, to the secondary first component and add the primary first component and the filtered secondary first component for provision of the mixer output.

Also disclosed is a method of operating a hearing device. The hearing device comprises a first housing configured as a behind-the-ear housing to be worn behind the pinna of a user; a second housing configured as an earpiece housing to be worn in or at the ear canal of a user; a wire connecting the first housing and the second housing; a primary set of microphones arranged in the first housing, the primary set of microphones including a primary first microphone and a primary second microphone; a secondary microphone arranged in the second housing; a mixing module; a processor; and a receiver. The method comprises obtaining a primary first microphone input signal with the primary first microphone; obtaining a primary second microphone input signal with the primary second microphone; and obtaining a secondary microphone input signal with the secondary microphone.

The method comprises providing a primary mixer input based on the primary first microphone input signal and the primary second microphone input signal. In the method, providing a primary mixer input may comprise pre-processing, such as filtering and/or adding, the primary first microphone input signal and the primary second microphone input signal, e.g. with a primary pre-processor. Filtering the primary first microphone input signal and the primary second microphone input signal may comprise performing pinna restoration of the primary first microphone input signal, e.g. with a first filter of the primary pre-processor, and/or the primary second microphone input signal, e.g. with a second filter of the primary pre-processor.

The method comprises providing a secondary mixer input based on the secondary microphone input signal. In the method, providing a secondary mixer input may comprise pre-processing, such as filtering, the secondary (first) microphone input signal, e.g. with a secondary pre-processor. The filtered secondary microphone input signal may be used as the secondary mixer input.

The method comprises mixing a primary first component of the primary mixer input and a secondary first component of the secondary mixer input for provision of a first component of a mixer output; processing the mixer output for provision of an electrical output signal; and converting the electrical output signal to an audio output signal.

It is to be noted that features described in relation to the hearing device are also applicable to the method and vice versa.

FIG. 1 shows exemplary hearing devices. The hearing device 2, 2A comprises a first housing 4 configured as a behind-the-ear housing to be worn behind the pinna of a user; a second housing 6 configured as an earpiece housing to be worn in or at the ear canal of a user; and a wire 8 connecting the first housing 4 and the second housing 6. The hearing device 2, 2A comprises a primary set of microphones 10, 12 arranged in the first housing 4, the primary set of microphones including a primary first microphone 10 for provision of a primary first microphone input signal 10A, and a primary second microphone 12 for provision of a primary second microphone input signal 12A. The hearing device 2, 2A comprises a secondary microphone 14 arranged in the second housing 6 for provision of a secondary microphone input signal 14A.

The hearing device 2, 2A comprises a mixing module 16 for provision of a mixer output 18 based on a primary mixer input 20 and a secondary mixer input 22, wherein the primary mixer input 20 is optionally based on the primary first microphone input signal 10A and/or the primary second microphone input signal 12A, and the secondary mixer input 22 is based on the secondary microphone input signal 14A.

The hearing device 2, 2A comprises a processor 24 for processing the mixer output 18 and providing an electrical output signal 26 based on mixer output 18; and a receiver 28 for converting the electrical output signal 26 to an audio output signal.

In hearing device 2, the mixing module 16 comprises a primary mixing filter 30 and a secondary mixing filter 32 for filtering broadband primary mixer input 20 and broadband secondary mixer input 22, respectively, in the time-domain. Filtered primary mixer input 33A and filtered secondary mixer input 33B are fed to adder 34 of the mixing module 16 for forming the mixer output 18. Accordingly, the mixing module 16 is configured to mix a broadband primary first component of the primary mixer input 20 and a secondary first component of the secondary mixer input 22 for provision of a broadband first component of the mixer output 18.

In hearing device 2A, the mixing module 16A comprises a primary gain unit 30A and a secondary gain unit 32A for applying respective gains or coefficients of first linear combination to broadband primary mixer input 20 and broadband secondary mixer input 22, respectively, in the time-domain. The outputs from gain units 30A and 32A are fed to adder 34 of the mixing module 16 for forming the mixer output 18. Accordingly, the mixing module 16A is configured to mix a broadband primary first component of the primary mixer input 20 and a secondary first component of the secondary mixer input 22 for provision of a broadband first component of the mixer output 18 by applying a first linear combination to broadband primary first component as primary mixer input 20 and broadband secondary first component as secondary mixer input 22 for provision of broadband first component as mixer output 18. In other words, the primary gain unit 30A applies a primary coefficient a_1 as a primary gain to the primary mixer input 20 and the secondary gain unit 32A applies a secondary coefficient b_1 as a secondary gain to the secondary mixer input 22. The primary coefficient a_1 may be in the range from 0.1 to 0.9 and/or the secondary coefficient b_1 may be in the range from 0.1 to 0.9.

The hearing device 2, 2A may comprise a primary pre-processor 36 for forming the primary mixer input 20 based on the primary first microphone input signal 10A and/or the primary second microphone input signal 12A. In the primary pre-processer 36, a first filter 36A optionally filters primary first microphone input signal 10A and a second filter 36B optionally filters the primary second microphone input signal 12A. The (optionally filtered) primary first microphone input signal 10A and the (optionally filtered) primary second microphone input signal 12A are fed to adder 36C for forming the primary mixer input 20 as the sum of (optionally filtered) primary first microphone input signal 10A and (optionally filtered) primary second microphone input signal 12A. The first filter 36A and the second filter 36B may be pinna-restoration filters.

The hearing device 2 and/or the hearing device, 2A may comprise a secondary pre-processor 38 for forming the secondary mixer input 22 based on the secondary microphone input signal 14A. The secondary microphone input signal 14A may be fed to the respective mixing module 16, 16A as the secondary mixer input. In the secondary pre-processer 38, a filter and/or a delay 36A optionally filters and/or delays secondary microphone input signal 14A for provision of secondary mixer input 22, e.g. for the secondary mixer input 22 to match the primary mixer input 20.

The hearing device 2 and/or the hearing device 2A optionally comprises a mixing controller 44 configured to apply a mixing scheme in the mixing module 16, 16A, e.g. based on a control parameter indicative of instability in the hearing device 2, 2A. The control parameter may be fed directly to the mixing controller from processor 24 as indicated by dashed conductor 46. Alternatively, or in combination, the mixing controller 44 may be configured to determine the control parameter, e.g. based on one or more operating parameters from processor 24 as indicated by dashed conductor 46 and/or one or both of electrical output signal 26 and secondary microphone input signal 14A as indicated by respective dashed conductors 48, 50. The control parameter may be indicative of feedback and/or howling in the hearing device. In one or more exemplary hearing devices, the primary first microphone input signal 10A and/or primary second microphone input signal 12A (of filtered versions thereof) is fed to the mixing controller 44 for determining the control parameter based on the primary first microphone input signal 10A and/or primary second microphone input signal 12A. Primary mixer input 20 and/or secondary mixer input 22 may be fed to the mixing controller 44 for determining the control parameter based on one or both of these inputs 20, 22. In other words, the control parameter may be fed to the mixing controller 44, e.g. from the processor 24, or determined in the mixing controller 44.

The mixing controller 44 controls the mixing module 16, 16A, e.g. by setting filter coefficient(s) or coefficients of mixing filters 30, 32 or gain units 30A, 32A, respectively with control signal 52.

Figure 2:
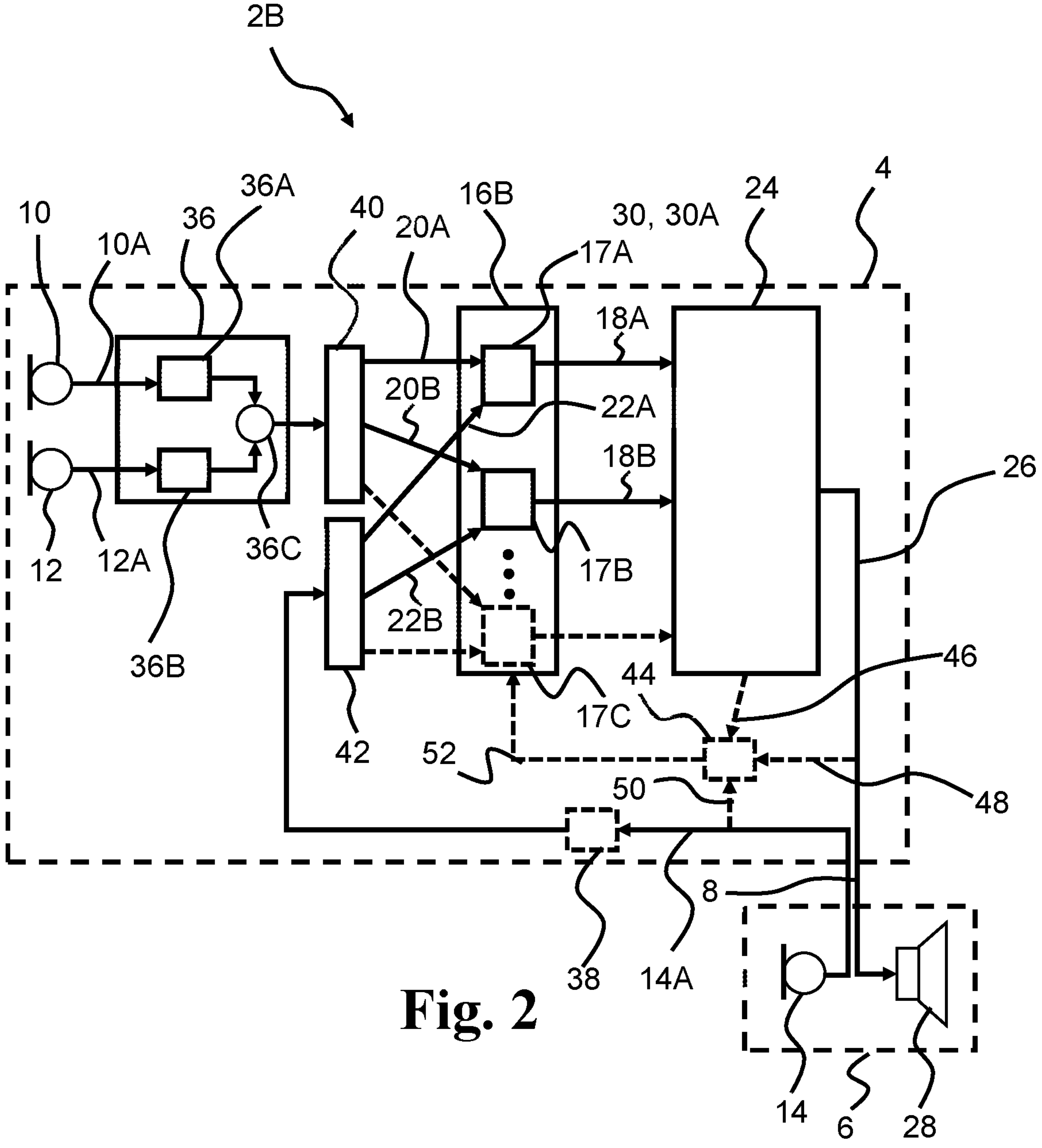
FIG. 2 schematically illustrates an exemplary hearing device.

FIG. 2 shows a hearing device with multi-band mixing module. The hearing device 2B comprises a primary filter-bank 40 for provision of a multi-band primary mixer input comprising N components of the primary mixer input including primary first component 20A and primary second component 20B of primary mixer input based on microphone input signals 10A and 12A. The hearing device 2B comprises a secondary filter-bank 42 for provision of a multi-band secondary mixer input comprising N components of the secondary mixer input (N may be larger than 5 or larger than 15) including secondary first component 22A and secondary second component 22B of secondary mixer input based on microphone input signal 14A.

The mixing module 16B comprises a first linear combiner 17A configured to mix primary first component 20A and secondary first component 22A by applying a first linear combination defined by primary coefficient a_1 and secondary coefficient b_1 to respective components 20A, 22A for provision of a first component 18A of the mixer output. The mixing module 16B comprises a second linear combiner 17B configured to mix primary second component 20B and secondary second component 22B by applying a second linear combination defined by primary coefficient a_2 and secondary coefficient b_2 to respective components 20B, 22B for provision of a second component 18B of the mixer output. The mixing module 16B may comprise N linear combiners including N'th linear combiner 17C configured to mix respective N primary and secondary components for provision of N components of the mixer output. The second linear combination is different from the first linear combination.

The hearing device 2B optionally comprises a mixing controller 44 configured to apply a mixing scheme in the mixing module 16B, e.g. based on a control parameter indicative of instability in the hearing device 2B. The control parameter may be fed directly to the mixing controller from processor 24 as indicated by dashed line 46. Alternatively, or in combination, the mixing controller 44 may be configured to determine the control parameter, e.g. based on one or more operating parameters from processor 24 as indicated by dashed conductor 46 and/or one or both of electrical output signal 26 and secondary microphone input signal 14A as indicated by respective dashed connectors 48, 50. The mixing controller 44 optionally controls the mixing module 16B, e.g. by setting linear combinations/coefficients of linear combiners 17A, 17B, . . . , 17C with control signal 52. The control parameter may be indicative of feedback and/or howling in the hearing device. In one or more exemplary hearing devices, the primary first microphone input signal 10A and/or primary second microphone input signal 12A (of filtered versions thereof) is fed to the mixing controller 44 for determining the control parameter based on the primary first microphone input signal 10A and/or primary second microphone input signal 12A. Primary mixer input 20 and/or secondary mixer input 22 may be fed to the mixing controller 44 for determining the control parameter based on one or both of these inputs 20, 22. In other words, the control parameter may be fed to the mixing controller 44, e.g. from the processor 24, or determined in the mixing controller 44.

The mixing controller 44 controls the mixing module 16B, e.g. by setting linear combinations/coefficients of linear combiners 17A, 17B with control signal 52.

Figure 3:
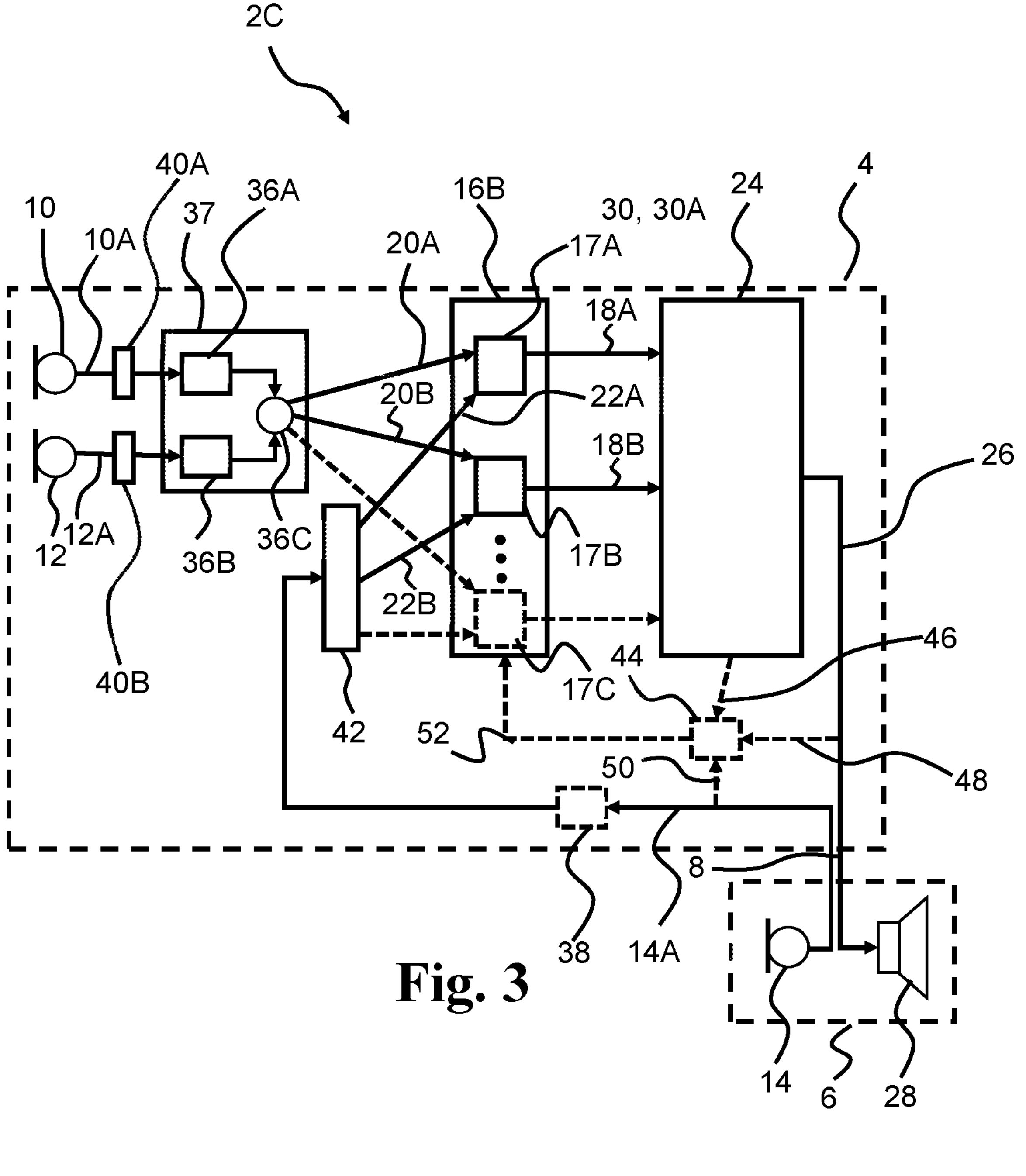
FIG. 3 schematically illustrates an exemplary hearing device.

FIG. 3 shows a hearing device with multi-band primary pre-processor 37 and multi-band mixing module 16B. The hearing device 2C comprises a primary first filter-bank 40A for provision of a multi-band primary first microphone input signal comprising N components that are fed to multiband pre-processor 37. The hearing device 2C comprises a primary second filter-bank 40B for provision of a multi-band primary second microphone input signal comprising N components that are fed to multiband pre-processor 37. The first filter 36A, the second filter 36B and adder 36C of pre-processor 37 are multi-band implementations for provision of multi-band primary mixer input. Thereby, multi-band pinna restoration and multiband mixing is provided, which in turn may increase the user experience by improving directional cues with reduced howling and/or feedback.

Figure 4:
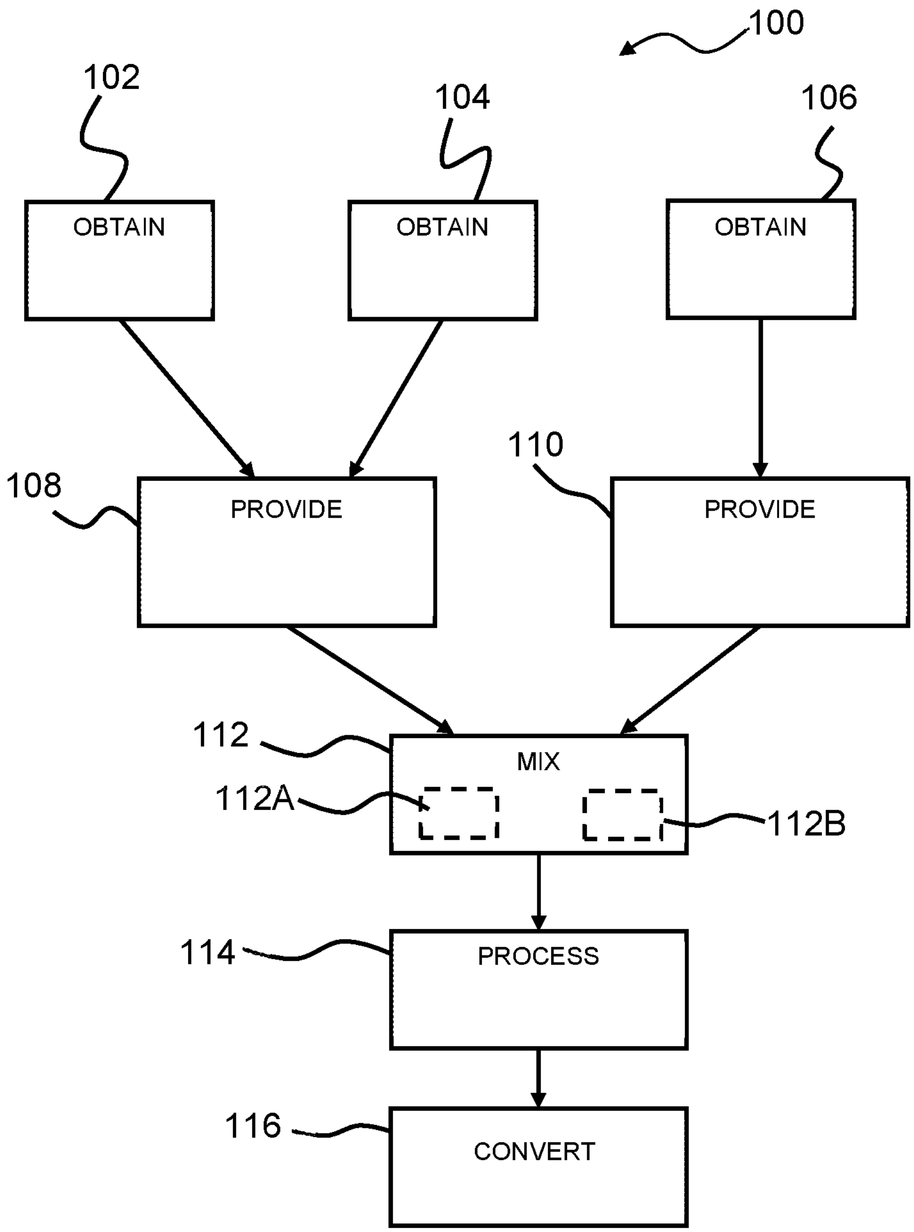
FIG. 4 is a flow diagram of an exemplary method according to the disclosure.

FIG. 4 is a flow diagram of an exemplary method of operating a hearing device. The hearing device comprises a first housing configured as a behind-the-ear housing to be worn behind the pinna of a user; a second housing configured as an earpiece housing to be worn in or at the ear canal of a user; a wire connecting the first housing and the second housing; a primary set of microphones arranged in the first housing, the primary set of microphones including a primary first microphone and a primary second microphone; a secondary microphone arranged in the second housing; a mixing module; a processor; and a receiver. The method 100 comprises obtaining 102 a primary first microphone input signal with the primary first microphone, e.g. primary first microphone input signal 10A; obtaining 104 a primary second microphone input signal with the primary second microphone, primary second microphone input signal 12A; and obtaining 106 a secondary microphone input signal with the secondary microphone, e.g. secondary microphone input signal 14A. The method 100 comprises providing 108 a primary mixer input based on the primary first microphone input signal and the primary second microphone input signal; providing 110 a secondary mixer input based on the secondary microphone input signal; mixing 112 the primary mixer input and the secondary mixer input including mixing 112A a primary first component of the primary mixer input and a secondary first component of the secondary mixer input for provision of a first component of a mixer output and optionally mixing 112B a primary second component of the primary mixer input and a secondary second component of the secondary mixer input for provision of a second component of a mixer output; processing 114 the mixer output for provision of an electrical output signal; and converting 116 the electrical output signal to an audio output signal.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-4 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. Accordingly, the specification and drawings are to be regarded in an illustrative rather than restrictive sense. The claimed invention is intended to cover all alternatives, modifications, and equivalents.

LIST OF REFERENCES

2, 2A, 2B, 2C hearing device
4 first housing
6 second housing
8 wire
10 primary first microphone
10A primary first microphone input signal
12 primary second microphone
12A primary second microphone input signal
14 secondary microphone
14A secondary microphone input signal
16, 16A, 16B mixing module
17A first linear combiner
17B second linear combiner
17C N'th linear combiner
18 mixer output
18A first component of mixer output
18B second component of mixer output
20 primary mixer input
20A primary first component of primary mixer input
20B primary second component of primary mixer input
22 secondary mixer input
22A secondary first component of secondary mixer input
22B secondary second component of secondary mixer input
24 processor
26 electrical output signal
28 receiver
30 primary mixing filter
30A primary gain unit
32 secondary mixing filter
32A secondary gain unit
33A filtered primary mixer input
33B filtered secondary mixer input
34 adder
36, 37 primary pre-processor
36A first filter
36B second filter
36C adder
38 secondary pre-processor
40 primary filter-bank
40A primary first filter-bank
40B primary second filter-bank
42 secondary filter-bank
44 mixing controller
46 conductor
48 conductor
50 conductor
52 control signal
100 method of operating a hearing device
102 obtaining a primary first microphone input signal
104 obtaining a primary second microphone input signal
106 obtaining a secondary microphone input signal
108 providing a primary mixer input based on the primary first microphone input signal and the primary second microphone input signal
110 providing a secondary mixer input based on the secondary microphone input signal
112 mixing the primary mixer input and the secondary mixer input
112A mixing a primary first component of the primary mixer input and a secondary first component of the secondary mixer input
112B mixing a primary second component of the primary mixer input and a secondary second component of the secondary mixer input
114 processing the mixer output for provision of an electrical output signal
116 converting the electrical output signal to an audio output signal

The invention claimed is:

1. A hearing device comprising:

a first primary microphone for provision of a first primary microphone input signal, and a second primary microphone for provision of a second primary microphone input signal;

a secondary microphone for provision of a secondary microphone input signal;

a mixing module for provision of a mixer output based on a primary mixer input and a secondary mixer input, wherein the primary mixer input is based on the first primary microphone input signal and the second primary microphone input signal, and the secondary mixer input is based on the secondary microphone input signal;

a processing unit configured to process the mixer output and to provide an electrical output signal based on the mixer output; and a receiver for converting the electrical output signal to an audio output signal;

wherein the mixing module is configured to mix a first component of the primary mixer input and a first component of the secondary mixer input for provision of a first component of the mixer output, and wherein the mixing module is configured to mix the first component of the primary mixer input and the first component of the second mixer input after obtaining a control parameter.

2. The hearing device according to claim 1, wherein the mixing module is configured to apply a first linear combination to the first component of the primary mixer input and the first component of the secondary mixer input for provision of the first component of the mixer output.

3. The hearing device according to claim 2, wherein the mixing module is configured to mix a second component of the primary mixer input and a second component of the secondary mixer input for provision of a second component of the mixer output; and wherein the mixing module is configured to apply a second linear combination to the second component of the primary mixer input and the second component of the secondary mixer input for provision of the second component of the mixer output.

4. The hearing device according to claim 3, wherein the second linear combination is different from the first linear combination.

5. The hearing device according to claim 2, wherein a primary coefficient and a secondary coefficient of the first linear combination are larger than 0.

6. The hearing device according to claim 1, wherein the mixing module is configured to mix a second component of the primary mixer input and a second component of the secondary mixer input for provision of a second component of the mixer output.

7. The hearing device according to claim 1, wherein the hearing device comprises a mixing controller configured to apply a mixing scheme in the mixing module based on the control parameter.

8. The hearing device according to claim 7, wherein the mixing controller is configured to increase an amount of the first component of the primary mixer input in the mixer output.

9. The hearing device according to claim 8, wherein the mixing controller is configured to increase an amount of the first component of the primary mixer input in the mixer output in response to the control parameter.

10. The hearing device according to claim 7, wherein the mixing controller is configured to decrease an amount of the first component of the secondary mixer input in the mixer output.

11. The hearing device according to claim 10, wherein the mixing controller is configured to decrease an amount of the first component of the secondary mixer input in the mixer output in response to the control parameter.

12. The hearing device according to claim 7, wherein the mixing controller is configured to determine the control parameter based on the electrical output signal and the secondary microphone input signal, and determine the mixing scheme based on the control parameter.

13. The hearing device according to claim 1, wherein the mixing module is configured to mix the first component of the primary mixer input and the first component of the secondary mixer input by:

applying a first filter to the first component of the primary mixer input to obtain a first filtered component of the primary mixer input, applying a second filter to the first component of the primary mixer input to obtain a first filtered component of the secondary mixer input, and adding the filtered first component of the primary mixer input and the filtered first component of the secondary mixer input.

14. The hearing device according to claim 1, wherein the control parameter is indicative of feedback and/or howling.

15. The hearing device according to claim 1, wherein the mixer output is at least partly attributable to the first component of the primary mixer input and at least partly attributable to the first component of the secondary mixer input, in response to the control parameter.

16. The hearing device according to claim 1, wherein the control parameter is based on one or more gains, or a change in the one or more gains.

17. The hearing device according to claim 1, wherein the control parameter is based on one or more gains applied in compressor(s), or a change in the one or more gains applied in the compressor(s).

18. The hearing device according to claim 1, wherein the control parameter is based on one or more operating parameters of the hearing device.

19. The hearing device according to claim 1, wherein the control parameter is based on a program identifier.

20. The hearing device according to claim 1, wherein the control parameter is based on one or more feedback cancellation parameters.

21. The hearing device according to claim 1, wherein the control parameter is indicative of instability in a processing by the hearing device.

22. The hearing device according to claim 1, wherein the control parameter is based on a maximum stable gain.

23. The hearing device according to claim 22, wherein the maximum stable gain is for a frequency band or frequency bin.

24. The hearing device according to claim 1, wherein the control parameter is based on one or more coefficients.

25. A method performed by a hearing device, the hearing device comprising a first primary microphone, a second primary microphone, a secondary microphone, and a receiver, the method comprising:

obtaining a first primary microphone input signal with the first primary microphone;

obtaining a second primary microphone input signal with the second primary microphone;

obtaining a secondary microphone input signal with the secondary microphone;

providing a primary mixer input based on the first primary microphone input signal and the second primary microphone input signal;

providing a secondary mixer input based on the secondary microphone input signal;

mixing a first component of the primary mixer input and a first component of the secondary mixer input for provision of a first component of a mixer output;

processing the mixer output for provision of an electrical output signal; and converting the electrical output signal to an audio output signal;

wherein the mixer output is at least partly attributable to the first component of the primary mixer input and at least partly attributable to the first component of the secondary mixer input, after obtaining a control parameter.

26. The method according to claim 25, wherein the mixer output is at least partly attributable to the first component of the primary mixer input and at least partly attributable to the first component of the secondary mixer input, in response to the control parameter.

27. The method according to claim 25, wherein the control parameter is indicative of feedback and/or howling.

28. The method according to claim 25, wherein the control parameter is based on one or more gains, or a change in the one or more gains.

29. The method according to claim 25, wherein the control parameter is based on one or more gains applied in compressor(s), or a change in the one or more gains applied in the compressor(s).

30. The method according to claim 25, wherein the control parameter is based on one or more operating parameters of the hearing device.

31. The method according to claim 25, wherein the control parameter is based on a program identifier.

32. The method according to claim 25, wherein the control parameter is based on one or more feedback cancellation parameters.

33. The method according to claim 25, wherein the control parameter is indicative of instability in a processing by the hearing device.

34. The method according to claim 25, wherein the control parameter is based on a maximum stable gain.

35. The method according to claim 34, wherein the maximum stable gain is for a frequency band or frequency bin.

36. The method according to claim 25, wherein the control parameter is based on one or more coefficients.

* * * * *